UNITED STATES PATENT OFFICE.

RUDOLF SILBERBERG, OF JERSEY CITY, NEW JERSEY, ASSIGNOR OF ONE-HALF TO HENRY W. HOOPS, JR., OF SAME PLACE.

CHROMIUM MORDANT.

SPECIFICATION forming part of Letters Patent No. 319,032, dated June 2, 1885.

Application filed March 25, 1885. (No specimens.) Patented in Canada April 20, 1885, No. 21,458.

*To all whom it may concern:*

Be it known that I, RUDOLF SILBERBERG, a citizen of the United States, residing at Jersey City, in the county of Hudson and State of New Jersey, have invented certain new and useful Improvements in Chromium Products, of which the following is a specification.

My invention consists in the manufacture of a mordant consisting of a chromium compound capable, when so used, of producing a fixed dye with aniline colors, and the process of production constituting a ready and economical mode of manufacture.

In the manufacture of the improved product I dissolve fifty-six pounds of bichromate of potash in ninety-three pints of boiling water with fifty-five pints of nitrate acid of a strength of 36° Baumé. A solution of twenty-nine pounds of oxalic acid is now made in sixty pints of water, and sixteen pints of glycerine of a strength of 28° Baumé are added. The oxalic-acid solution is now added in small quantities to the potash solution, which is continually stirred, a second portion of the acid solution only being added after the effervescence resulting from the addition of the previous quantity has ceased. As soon as the two solutions have been mixed, the greenish-brown liquid resulting from the mixture is heated to the boiling-point, and is boiled until a diluted solution appears of a clear green color. The boiling is then discontinued, and the solution is left to stand and cool, when nitrate of potash will be thrown down in the form of crystals, while the liquor will contain in solution an oxalate of chromium.

The reaction resulting from the above operations is illustrated in the following formula:
$$K_2Cr_2O_7 + 2HNO_3 + (C_3H_8O_3 + 6C_2H_2O_4) = Cr_2(C_2HO_4)6 + 2KNO_3 + 6H_2O + 3CO.$$

The oxalate of chromium may be obtained as a solid by evaporation; but when used as a mordant it is dissolved in water to form a solution of a strength of from 35° to 38° Baumé, such a mordant being of great strength, and giving good and fast blue-blacks with decoctions or extracts of logwood.

The said mordant may also be used for mordanting fabrics consisting in whole or in part of cotton, which, when afterward dyed with aniline colors, will acquire strong and fast colors.

I do not here claim the oxalate of chromium, nor more fully set forth the special use of the said substance for dyeing with aniline, as this is fully described in a separate application for patent filed simultaneously herewith; and as the invention herein set forth relates to the substance and its manufacture, and not to its special applications.

Without limiting myself to the precise method of manufacture herein set forth, I claim—

The within-described mode of making a mordant, consisting of oxalate of chromium, the same consisting in adding to a solution of bichromate of potash, water, and nitric acid a solution of oxalic acid in water and glycerine, and then boiling the solutions and drawing off the clear liquor, substantially as described.

In testimony whereof I have signed my name to this specification in the presence of two subscribing witnesses.

RUDOLF SILBERBERG.

Witnesses:
CHARLES E. FOSTER,
W. C. DUVALL.